UNITED STATES PATENT OFFICE.

THOMAS SOUTHALL AND CHARLES CRUDGINGTON, OF KIDDERMINSTER, ENGLAND.

IMPROVEMENT IN THE PROCESS OF MANUFACTURING IRON AND STEEL BY THE INTRODUCTION OF CERTAIN CHEMICAL COMPOUNDS WHILE THE METAL IS IN THE FLUID STATE.

Specification forming part of Letters Patent No. 3,742, dated September 14, 1844.

*To all whom it may concern:*

Be it known that we, THOMAS SOUTHALL, of Kidderminster, in the county of Worcester, druggist, and CHARLES CRUDGINGTON, of the same place, banker, subjects of the Queen of Great Britain, have invented or discovered new and useful Improvements in the Manufacture of Iron and Steel; and we, the said THOMAS SOUTHALL and CHARLES CRUDGINGTON, do hereby declare the nature of our invention and the manner in which the same is to be performed are fully described and ascertained in and by the following statement thereof—that is to say:

Our invention consists of treating iron, when in a melted state in the process of manufacturing malleable iron, by applying sulphur and a nitrate, as hereinafter explained, whereby the iron so treated may be greatly improved in quality, and also, when desired, iron may be converted into steel.

In order that the invention may be most fully understood and readily carried into effect, we will proceed to describe the means pursued by us.

We take sulphur and niter with borax soda or potash and alum; and the qualities of these ingredients used by us are, sulphur in the form of brimstone of commerce, niter in the form of saltpeter of commerce, and the borax soda, (subcarbonate of soda,) potash, and alum are of the usual qualities ordinarily sold in shops; and we mention these circumstances in order to give the manufacturer the best information we possess, that the invention may be well understood and readily practiced. At the same time we do not confine ourselves to these qualities.

The materials above mentioned are broken into a small granular state and equal parts, by weight, of sulphur, niter, borax, and alum, with half a part, by weight, of soda or potash, and are to be well mixed together. We make up these mixed matters into parcels of about one and a half pound each, that quantity being proper for treating about four hundred-weight of pig-iron, and in like proportion for any quantities of iron in the puddling-furnace. These proportions are used when it is wished simply to improve the quality of the iron; but when it is desired to convert the iron into steel, then we have found that about four pounds or more of the mixture are required for each four hundred-weight of iron.

The above parcels of materials are placed in packets of thick paper, which we have found to be a convenient mode of getting the mixed matters below the surface of the melted iron before the action caused thereby takes place. A quantity of iron being in a melted and white-hot state in an ordinary puddling-furnace, whether such melted iron be obtained from melting pigs or otherwise, as is well understood when manufacturing malleable iron, we now treat such melted iron in the following manner: The damper of the furnace is to be first closed for about a minute. The packets containing the sulphur, niter, and other matters, as above explained, are then to be introduced by the puddler into the melted iron in his furnace, and as he incorporates the same by well stirring the iron the damper of the furnace is to be gradually opened, and a violent boiling of the iron will take place for some minutes, and the iron will then "come to nature," and the same may be balled and then worked under the tilt-hammer and rolled, as in making malleable iron according to the means now generally practiced, and the result will be greatly improved iron or steel, according to the quantity of the ingredients used.

As the qualities of iron differ very much, we have found that the quantities of the materials above mentioned requisite to produce as nearly as may be a similar effect in each case somewhat vary; but the manufacturer who has operated with care and observation upon given qualities of iron will on subsequent occasions, if the process of puddling be carried on with like care, produce similar results from like qualities and quantities of materials, and he will find that by increasing the quantity of the combined materials for the same quantity and quality of iron the product obtained will more and more approach the character of steel, care being observed that the quantity of the matters above mentioned be not increased so as to make the steel too brittle; for it is to be understood that according to our invention the same process and the same ingredients are used for improving the quality of iron and for making steel, the only difference being that a larger quantity of the matters is introduced into the melted iron for making steel than when it is simply desired to improve the quality of the malleable iron which may be produced from particular qualities of iron. And we would remark that so far as our experience goes, although the materials employed according to our invention improve every class of iron which we have experimented on, yet there still remains differences of quality of iron.

Although we believe it best to employ all the matters above mentioned, yet we do not confine ourselves thereto, as the effects derived from treating melted iron with sulphur and a nitrate in the process of puddling are very beneficial without the employment of the other matters.

We would further remark that we are aware that some of the materials herein mentioned as being used by us have before been employed in the manufacture of iron, such as, niter, soda, and potash; and we mention this circumstance in order to state that we do not claim the separate use of either of the ingredients mentioned, nor do we confine ourselves to the details herein set forth, so long as the peculiar character of the invention be retained; but

We claim—

The introduction into the melted iron, &c., of a compound of sulphur and a nitrate, either alone or combined with either or all the ingredients enumerated in the foregoing description, as described, whether the proportions hereinbefore given be followed or changed.

THOS. SOUTHALL.
C. CRUDGINGTON.

Witnesses:
W. H. RITCHIE,
   *Of Lincoln's Inn.*
S. CARPMALL.